Jan. 7, 1936.     W. T. HAGER     2,026,530
INCUBATOR
Filed July 22, 1931     8 Sheets-Sheet 1

Wilson T. Hager,
INVENTOR
BY Victor J. Evans
ATTORNEY

Patented Jan. 7, 1936

2,026,530

UNITED STATES PATENT OFFICE 2,026,530

INCUBATOR

Wilson T. Hager, Erwinna, Pa., assignor to Willet V. Hager, Erwinna, Pa.

Application July 22, 1931, Serial No. 552,486

14 Claims. (Cl. 119—37)

This invention relates to an improved incubator for hatching chickens as well as pheasants, and essentially, the invention has for its purpose the creation of constant uniformly heated air laden with constant uniform moisture with a constant and uniform supply of air, all of which being distributed regularly and with uniformity to every portion of the interior of the cabinet of the incubator.

Another purpose of the invention is to provide, in an incubator, air intakes adjacent the bottom of the incubator cabinet with air outlets adjacent the top of the incubator cabinet, with a constant intake of air at the central portion of one side of the incubator cabinet. This air is constantly agitated, as well as uniformly heated and laden with moisture, there being means for regularly circulating the air to all portions of the interior of the incubator cabinet.

In order to insure a constant and uniform distribution of such moisture laden heated air, it is the purpose of the present invention to provide means for causing centrifugal action on such air from polygonal locations near the center of the incubator cabinet in order to cause a constant and uniform circulation to all corners of the cabinet, which experiments have found to produce a substantially simultaneous hatch of eggs.

Another purpose is to provide in an incubator a revoluble drum centrally of the incubator cabinet, which sends off the air centrifugally, from polygonal locations, the air being forced into an inner drum, where it becomes laden with moisture gathered from a plurality of elements, which dip into a water container, in combination with unitary means for imparting revoluble movement to the moisture gathering elements.

Another purpose of the invention is to provide additional means of a rotating character of a size approximating the height of the incubator cabinet, with means at intervals thereon for dipping into water for insuring moisture for the air in all portions of the interior of the cabinet. Such means may or may not be in conformity with the contour of the incubator cabinet, and if it substantially conforms to the shape of the incubator cabinet, moisture to all parts or corners of the cabinet interior will be assured.

A further purpose of the invention is to utilize substantially the entire interior space of the cabinet for the support of super-imposed egg containing trays.

It is to be understood that the particulars herein given are in no way limitative, and that while still keeping within the scope of the invention, any desired modification of details and proportions may be made in the construction of the appliance according to circumstances.

In the drawings:—

Figure 2 is a vertical sectional view on line 2—2 of Figure 1.

Figure 12 is a sectional view on line 12—12 of Figure 11.

Referring to the drawings 1 identifies an incubator cabinet, it being obvious that this cabinet can be of any size and of any configuration or shape, the walls thereof being of any suitable thickness. The cabinet is preferably constructed of wood, and each panel or side or face thereof comprises inner and outer thicknesses 2 and 3 including an intermediate thickness 4 of any suitable heat insulating material, preferably composition or wall board.

The cabinet is composed of side and end panels, which are joined together at the corners of the cabinet by the wood screws 10a, and by the removal of these screws the side and end panels of the cabinet can be detached from each other.

Figure 1:
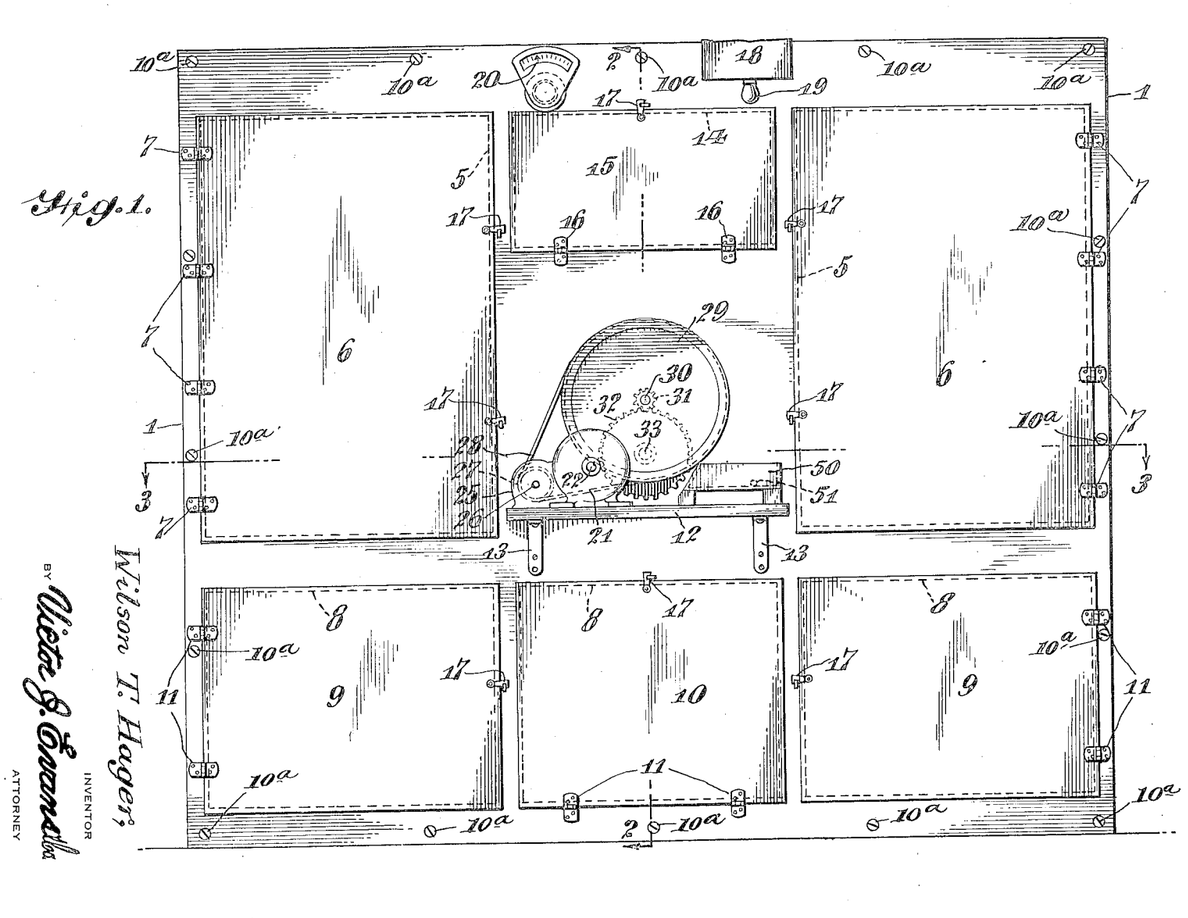
Figure 1 is a view in front elevation of the improved incubator constructed in accordance with the invention.

The face of the cabinet as illustrated in Figure 1 has several ways of gaining access to the interior of the cabinet where the eggs are hatched. These different ways of entrance to the cabinet consist of openings 5 at the upper right and left portions of the face of the cabinet, which are closed by doors 6 hinged at 7, and the openings 8 at the lower central and right and left hand ends of the face of the cabinet closed by doors 9 and 10 likewise hinged at 11. The upper part of the front face of the cabinet centrally thereof immediately above the door 10 constitutes a solid wall, on which a shelf 12 is supported by brackets 13.

The upper part of the central solid wall of the front face of the cabinet has an opening 14 closed by a door 15, hinged at 16.

The various doors 6, 9, 10 and 15 have suitable latches 17.

Also on the front face of the cabinet above the door 15 is a relay containing box 18, and an exposed red signal light 19 are arranged.

Likewise an indicator 20 is supported on the front face of the cabinet above the door 15.

A motor 21 is mounted upon the shelf 12, and its shaft 22 carries a gear 23, which in turn meshes with the gear 24. The gears 23 and 24 are mounted in the housing 25, and the shaft 26 of the gear 24 carries a pulley 27 with which a belt 28 engages and in turn passes about a large pulley 29 on one end of the stub shaft 30, which carries a pinion 31 meshing with a gear 32, which is rotatable with a shaft 33. This shaft 33 has its forward portion in bearings 34 and 35, the former being fastened to and carried by a metal bar 36 of an interior skeleton frame 37, which is mounted on the interior 38 of the cabinet, and which skeleton frame may be constructed of any suitable angle elements. The forward portion of the shaft 33 is also mounted in a bearing plate 34a. The other bearing 35 is carried by an interior water trough or container 39, which is suspended on the shaft 33 by means of the bearing 35 and a bearing 40 at the inner end of the trough. A drum 41 is mounted in the trough 39, which contains water, and fixed to the shaft 33 at 42 is a plurality of moisture gatherers 43, which are in the form of wire fabric segments as more clearly shown in Figure 5.

These wire fabric segments are in staggered relation on the shaft 33, so that the current of air derived from the rotation of the fan 44 at the rear of the inner drum 45, which is surrounded by an outer drum 46, will be broken up. The two drums 45 and 46 are spaced concentrically and rotatable with the shaft 33 through the medium of the spider 47 at the rear of the drums, which spider supports both drums, there being a ring 48 which spaces the drums apart. Movable with the ring 48 and the drums is an annular plate 49, which rotates at the rear of the incubator cabinet. The rear end of the shaft 33 is mounted in a bearing 47a of a spider 47.

In order to supply water to the trough 39 a receptacle 50 is mounted on the shelf 12 carried by the front face of the cabinet, and connected to the container or receptacle 50 is a pipe 51, which has a lateral branch 52 extending in a direction toward the trough and terminates in a portion 53, which passes through an opening 54a of a plate 54 loosely mounted on the shaft 33 at the front end of the drum 46 and through the front end wall of the trough, thereby feeding water to the trough, into which water the segments 43 dip. As previously stated the segments 43 are in staggered relation so that the air generated by the fan 44 will not have a direct passage through the drum 41, but will have an undulated course therethrough. The air will be thoroughly broken up and agitated during its passage through the drum 41. However a certain amount of the current of air generated by the fan 44 passes through the drum 45, and then out through the front open end of the drum 45, then back through the drum 46 and thence through the various elongated slots 55 of the drum 46. The slots 55 are arranged at intervals throughout the cylindrical wall of the drum 46, therefore the air will discharge from polygonal locations relative to the drum, and since the drum 46 rotates, the air will have a certain amount of centrifugal action in circulating within the interior of the cabinet.

The shafts 56 are mounted in bearings 57 carried by angle plates 58 of the skeleton frame 37, and mounted upon the shafts 56 are discs 59, on which the outer surface of the drum 46 is rotatably supported so as to provide for an even rotation of the two drums.

The fan 44 at the rear of the drums 45 and 46 is carried by a shaft 60 of a motor 61, the rear part of which fits in a depression 62 of a panel or door 63. Supporting bars 64 are secured at 65 to the panel 63, the supporting bars 64 being adjacent opposite portions of the motor 61, there being brackets 66 carried by the motor and in turn fastened at 67 to the supporting bars 64. In this manner the motor is operatively supported in position. The panel 63 is supported in an opening 67a in the rear wall of the incubator cabinet by means of the latches 68. Obviously by disengaging the latches the panel or door 63 may be removed and with it the motor and the fan 44, permitting access to the incubator cabinet from the rear. The usual cord 69 incasing the usual electric wires is connected to the motors 61 and 21 and is provided with the usual socket receiving plug 71, which may be plugged in in any suitable electric outlet socket, whereby electrical current may be supplied to the motors.

Figures 3, 18, 19:
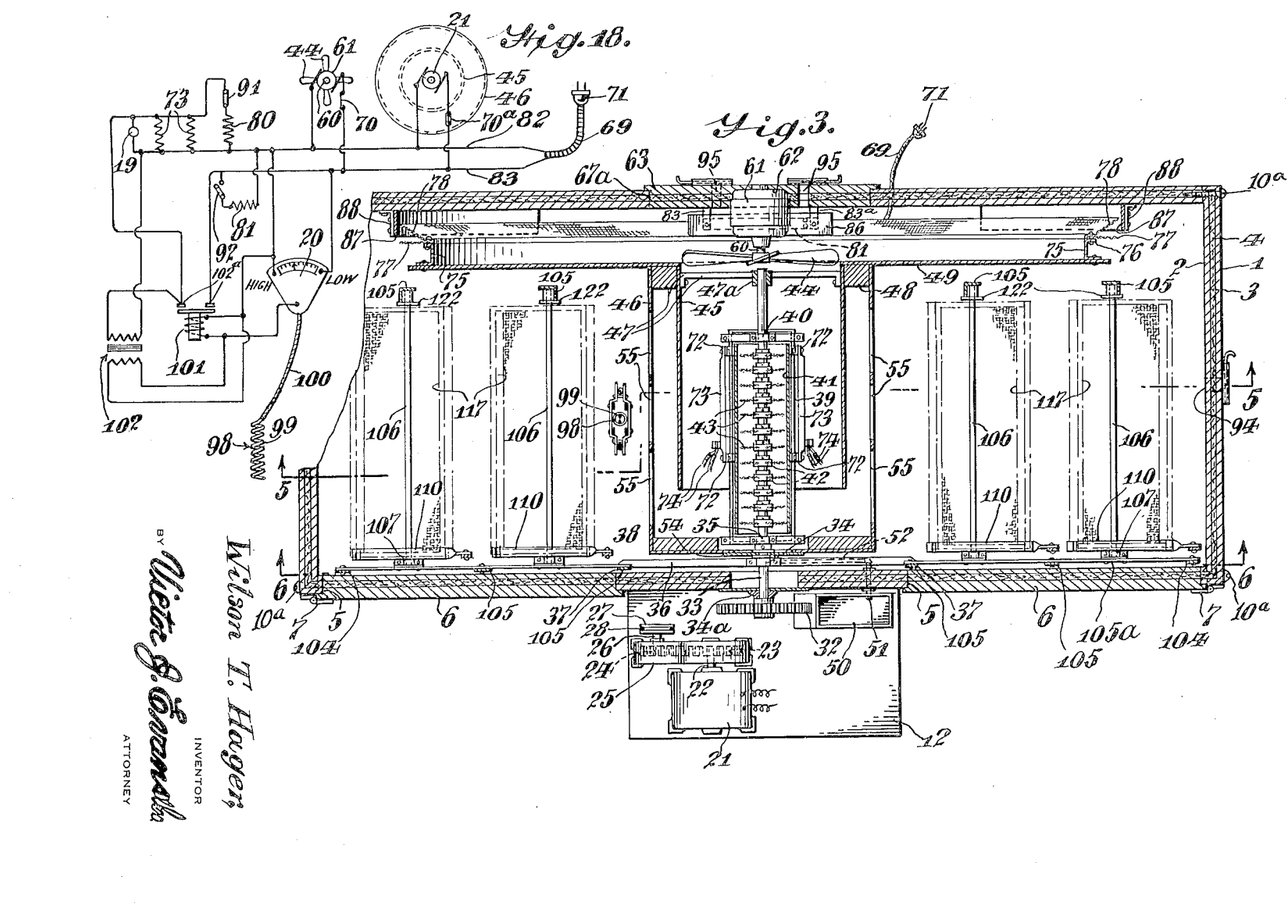
Figure 3 is a horizontal longitudinal sectional view on line 3—3 of Figure 1.
Figure 18 is a view of the diagram of the electric wiring for the heating elements, the thermostat relay, signal light and indicator and motors.
Figure 19 is a sectional view of a character to that in Figure 4, but showing a modification of movable moisture carriers.

Supported at 72 adjacent the edges of the opposite sides of the trough 39 (which is semi cylindrical) are resistance heating elements 73, which are in circuit with the motors 21 and 61, as disclosed in the wiring diagram in Figure 18, and when the mechanism of the incubator is in operation electrical current is furnished to the heating elements, for generating heat centrally of the cabinet.

The current of air generated by the fan 44 and being forced through the drum 45 is heated by the resistance heating elements, and due to the moisture gatherers dipping into the trough 39, the moisture gathered thereon is vaporized and thereby mixes with the heated air and is circulated in the interior of the incubator cabinet through the medium of centrifugal action, that is to say, as it discharges through the slots 55 of the drum 46 as it rotates.

Figures 6, 7, 8, 9, 10:
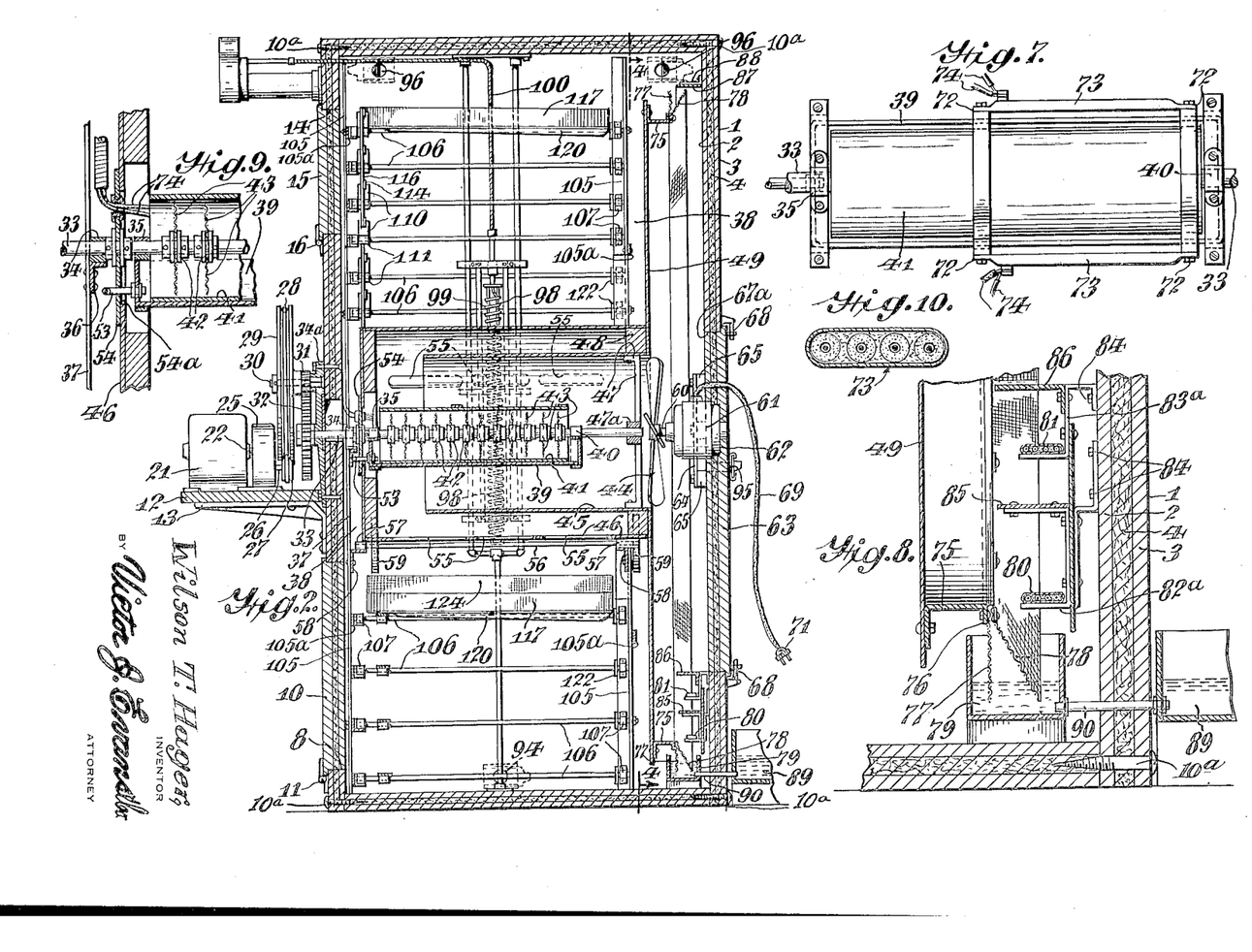
Figure 6 is a sectional view on line 6—6 of Figure 3, the handles 123 not being shown.
Figure 7 is an enlarged plan view of the innermost cylinder of the air circulating means.
Figure 8 is an enlarged detail sectional view of the lower right hand corner of Figure 2.
Figure 9 is an enlarged sectional view of the center portion of the left hand side of Figure 2.
Figure 10 is a detail view of a portion of one of the heating elements shown in Figure 8.
Figure 6:
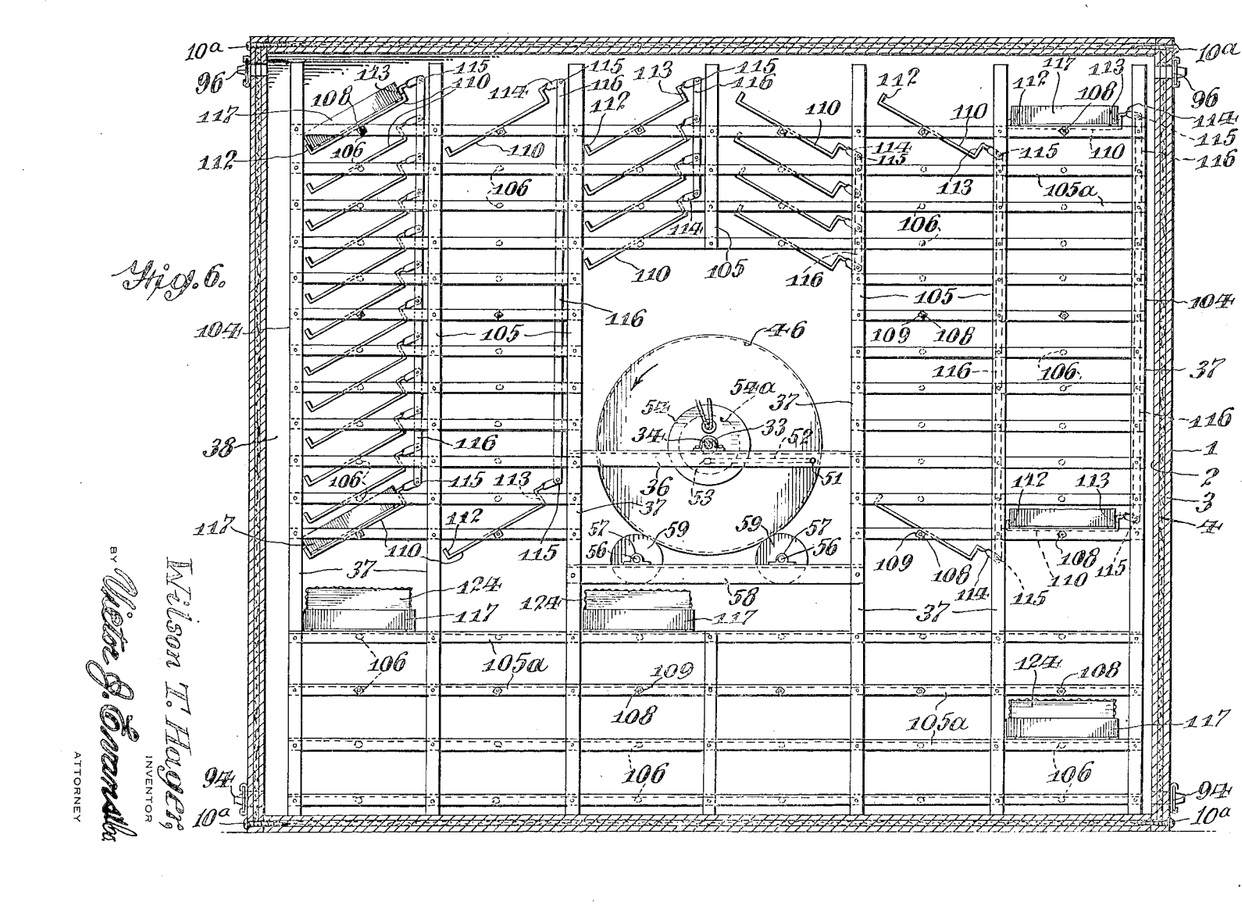

The circular plate 49 carries a lateral cylindrical flange 75, to a bent portion 76 of which pieces of circular wire fabric 77 and 78 are fastened, it being noted that the latter pieces 78 are deflected at an angle from the former as more clearly shown in Figures 2 and 8, and are adapted to dip into a water trough 79 at the bottom of the cabinet adjacent the rear wall. As the circular plate 49 rotates with the drums 45 and 46 the moisture carrying circular pieces 77 and 78 gather moisture from the water in the trough 79, which is vaporized by the heated air in the interior of the cabinet.

Just above the trough 79 and approximately centrally thereof are resistance heating elements 80 and 81, which are also in circuit with the motors 21 and 61 and the source of current supply over the main lead wires 82 and 83, as shown in the electrical diagram of Figure 18. These resistance heating elements also act to heat the air as it circulates within the cabinet, and since they are located adjacent and a little above the trough 79, the moisture on the circular pieces 77 and 78 is vaporized and mixes with the air, and thereby provides uniformly moisture laden air, which is agitated and uniformly distributed to all parts of the interior of the cabinet.

The heating elements 80 and 81 are supported by the brackets 82a and 83a, which are secured at 84 to the rear face of the cabinet, there being baffles 85 and 86 carried by the brackets, acting to baffle the moisture laden air and direct it toward the wire fabric pieces 77 and 78. Since the heating elements 80 and 81 are just above the trough 79, the heat from the elements has a tendency to vaporize the water in the trough, the vapor in turn circulating and mixing with the air in the interior of the cabinet, thereby insuring maintaining the heated air laden with moisture.

Figure 4:
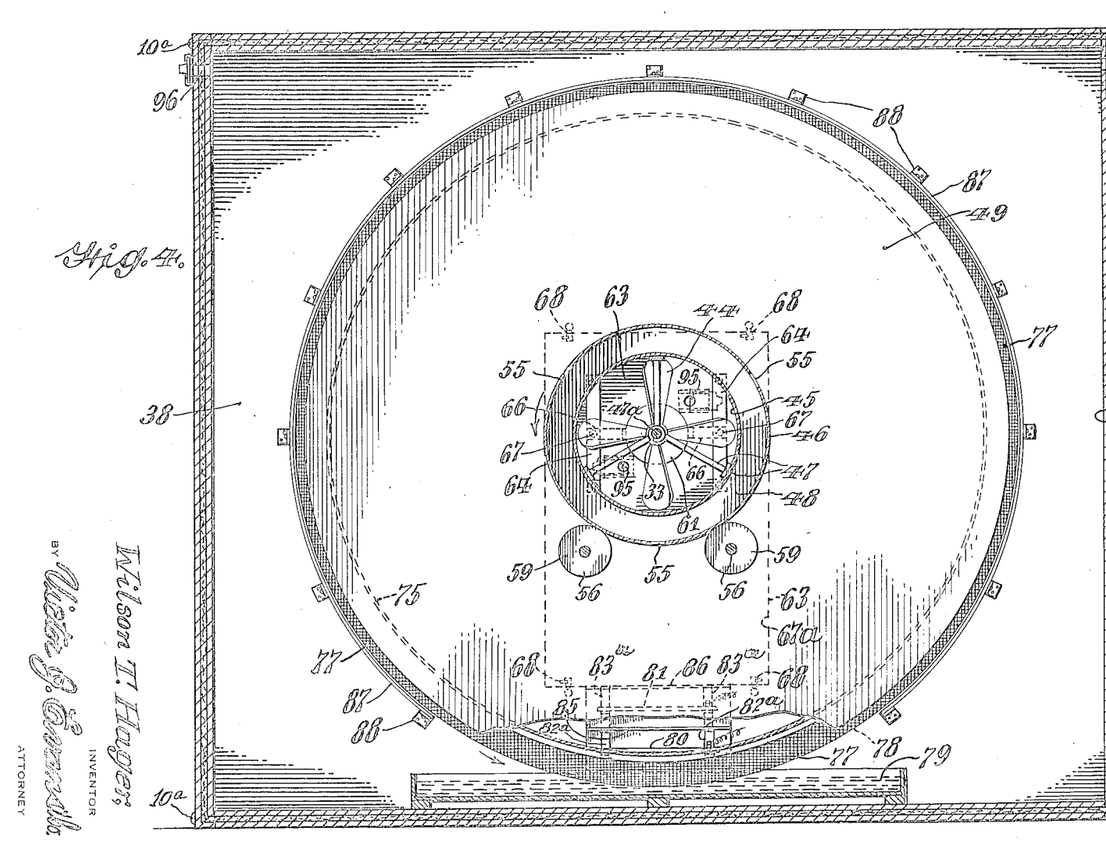
Figure 4 is a sectional view on line 4—4 of Figure 2.

As shown in Figure 4 an annular band 87 is supported by angle plates or brackets 88, which band substantially encircles the outer edges of the wire fabric pieces 77 and 78 and thereby tends to deflect the moisture laden air toward the eggs supported in the skeleton frame 37.

The water container 89 is located at the rear of the cabinet, more clearly shown in Figure 8, and has a pipe 90, connecting it with the trough 79, keeping the trough 79 supplied with water, in which the wire fabric pieces 77 and 78 travel, as the drums 45 and 46 and the circular plate 49 rotate.

The main conductors 82 and 83, which feed the motors 21 and 61 in parallel, also feed the light 19, the heaters 73, 80 and 81, the heaters 80 and 81 being controlled respectively by the switches 91 and 92 and the motors 61 and 21 respectively by the switches 70 and 70a.

When contact is made between the contacts 102b and 102c, some current passes through the resistor coil 102a, the indicator 20 and the relay 101, and even though the thermostat opens, current will still pass through 102 and 101, the heating element 81 carrying a portion of the load. Adjacent the bottom of the cabinet in the opposite end walls thereof are slide controlled vents 94, while the rear walls of the cabinet near the center thereof slide controlled air vents 95 are arranged for the intake of fresh air as the fan 44 rotates. The air vents 94 take in air near the bottom of the cabinet, while the vents 95 take in fresh air at the center of the cabinet. Air is drawn through the vents 95, as well as through the vent at the bottom, the fan 44 agitating the air and sending it through the drum 41 and the drum 45, the air passing out through the openings 55 causing a centrifugal action of the air, the air taking a circulating course through the interior of the cabinet, toward the bottom and toward the top, circulating in the direction of and about the marginal edge of the circular plate 49 within the annular band 87, down between the disc plates 49 and the rear wall of the cabinet, and then back through the drums 45 and 41, the air having a circulating course of this kind for the purpose of facilitating the hatching of the eggs.

The end walls of the cabinet adjacent the top have slide controlled vents 96, which are provided for permitting escape of air, the various slides of all the vents 94, 95 and 96 adapted to be adjusted according to the desired temperature on the interior 38 of the cabinet.

Mounted on the interior 38 of the cabinet and held in a proper position by means of a support is a conventional type of a thermostat 98, wherein the expansion and contraction of the helically coiled tube 99 will cause corresponding expansion and contraction of the rod 100, which is connected in a conventional manner to any well known temperature indicating and circuit control device 20, shown in the circuit diagram in Figure 18, as well as identified in Figures 1 and 2. By means of the thermostat 98 the control device 20 will indicate the temperature on the interior of the cabinet, as well as control the circuit, and by properly adjusting the various slide controlled intake air vents and discharge air vents, a uniform moisture laden temperature may be maintained on the interior of the cabinet, and due to the rotation of the drums for creating a centrifugal action on the interior of the cabinet a thorough and uniform distribution of moisture laden air may be maintained throughout all portions of the interior of the cabinet.

Experiments have shown that such uniform distribution and uniform moisture laden air on the interior of the cabinet insures a quicker and substantially simultaneous hatch of the eggs. Through the medium of experimental tests it has been found preferable to rotate the drums 45 and 46 and the circular plate 49 approximately 3½ revolutions per minute, thereby creating in addition to uniform distribution of the moisture laden air, a gradual centrifugal action of the air from polygonal locations. The electric circuit shown in Figure 18 includes a conventional relay 101 and a conventional transformer 102, which are housed in a box or container 18 on the front face of the cabinet as shown in Figure 1, the signal light 19 acting to indicate that the circuit is closed and the heaters are in operation, and that the incubator is in operation. The fan and the moistening means operate whether the light 19 is operating or not. When the plug 71 is inserted into a suitable receptacle, current flows over the conductor 82, through the motors, heating elements, if they be in circuit, and back to the source. The heating elements 73, light 19 and heating element 80 are connected across the conductors 82 and 83 in series with the contacts 102a of the relay 101, so that unless the relay is closed, the said heating elements and light 19 are inactive. The heating element 81 may be placed in circuit or cut out of circuit by proper adjustment of the switch 92 and the heating element 80 may be made to function with the heating elements 73 or not, according if the switch 91 is open or closed. The high and low contacts of the indicator 20 are connected respectively with the conductors 82 and 83 and the magnet of the relay 101 is connected across the high contact of the indicator and the center contact 100a. The secondary of the transformer 102 is connected across the magnet of the relay 101. If the relay be in open position and the thermostat moves to the low side so as to bridge the low contact and the contact 100a (Figure 18), current will flow from the conductor 83 to the low contact, thence to the contact 100a, thence through the magnet of the relay 101 and return to the source of the conductor 82. The magnet is thus energized and its armature will be elevated to bridge the contacts 102a, when current will flow over the conductor 83 to one of the contacts 102a, thence to the other, thence through the light 19, and resistances 73 (and resistance 80, if the switch 91 be closed), returning to the source of the conductor 82. But bridging the contacts 102a closes the circuit on the primary of the transformer 102, one of whose terminals is connected to one of the contacts 102a and the other of whose terminals is connected to the conductor 82. Thus the secondary of the transformer will be energized and will keep the magnet of the relay energized, so that the relay will be retained in closed circuit, irrespective of whether or not the thermostat is on closed circuit on the low side. When the temperature rises to the point where the thermostat is moved to the high side and bridges the high contact and center contact 100a, the magnet of the relay 101 is short-circuited, so that it is deprived of current that was previously supplied through the secondary of the transformer 102. The relay therefore will drop to open position and cut out the heating resistances, indicating the fact by extinguishing the light 19. On the dropping to the low temperature, the circuit is again closed by the thermostat and the previously described cycle of operation is repeated. The heater 18 is designed to be selectively cut into and out of circuit by the operation of the switch 92.

The skeleton frame 37 is made up of upright corner bars and intermediate vertical bars 104 and 105, and horizontal longitudinal bars 105a and is designed to fit the interior 38 of the cabinet in a position between the front and rear walls of the cabinet. It is obvious that this frame may be of any size according to the dimensions of the cabinet. The parts of the frame 37 are assembled in such wise as to support trays of eggs in superimposed positions and in a number of tiers.

Figures 11, 13, 14:
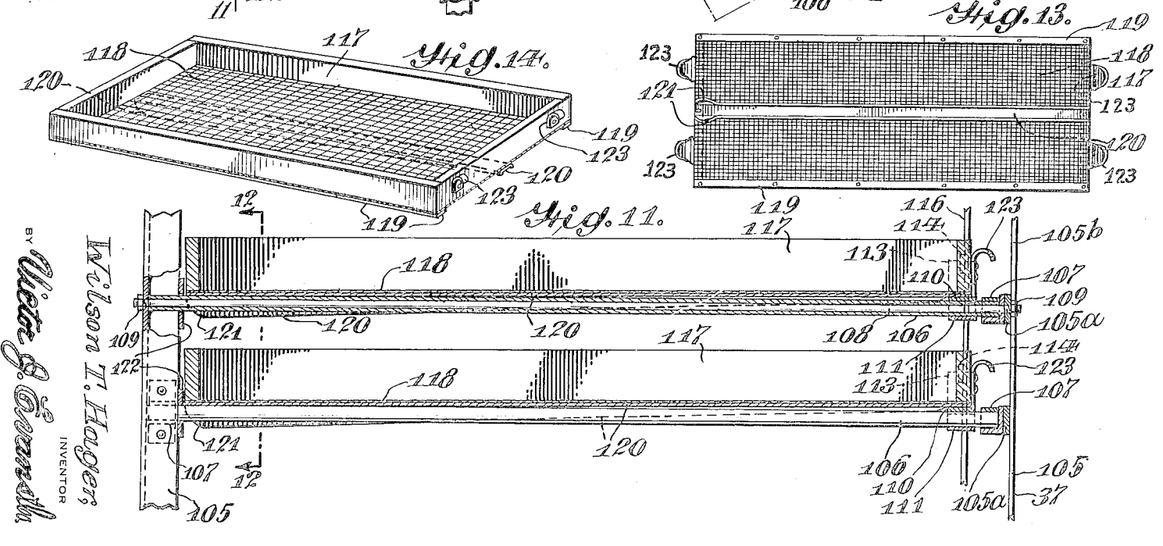
Figure 11 is a longitudinal sectional view on line 11—11 of Figure 15 through two of the egg trays, illustrating how the trays are mounted on supports for tilting movement.
Figure 13 is a bottom plan view of one of the egg trays.
Figure 14 is a detail perspective view of one of the egg trays.
Figure 15:
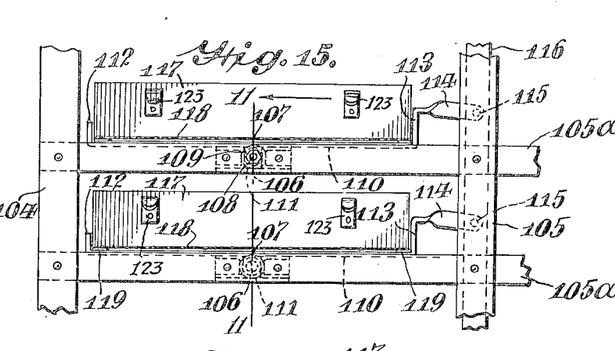
Figure 15 is an end view of the structure in Figure 11.
Figure 16:
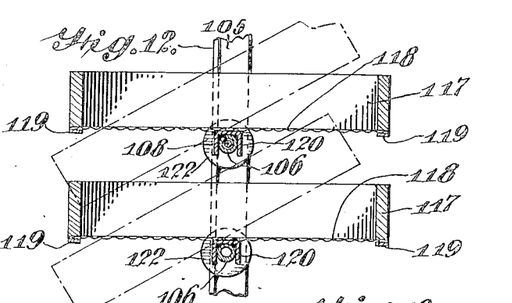

Tubular rods 106 are supported on the horizontal longitudinal bars 105a, there being clamping plates 107 engaging over the ends of the tubular rods to hold them in position, the clamping plates 107 at the rear of the rods being carried by vertical bars 105 at the rear of the frame, while the horizontal bars 105a are carried by the front intermediate vertical strips 105b shown more clearly in Figure 11.

Rods 108 pass through the tubular rods 106, and through the horizontal longitudinal angle bars 105a through the rear vertical bars 105 and are provided with nuts 109, thereby tieing and reinforcing the structure of the skeleton frame. In this instance the tubular rods 106 act as spacers and insure rigidity of the frame.

It is possible, when the drums are first removed, to remove the skeleton frame from the interior of the cabinet, by removing one of the ends of the cabinet, it being obvious that the various sides and ends of the cabinet are fastened together by wood screws or the like 10a. On the front end of the tubular rods strips 110 are rockably mounted by means of the clamps 111, the strips 110 being positioned as shown in Figures 3, 6, and 11. One end of each strip 110 is upbent as shown at 112 to provide a shoulder, while its opposite end is similarly bent to provide an opposite shoulder 113, and beyond this shoulder 113 the strip merges into an extension 114. The extensions 114 are pivotally connected at 115 to links 116, which may be operated for tilting the strips 110 to similar angular positions, that is to say in unison.

As previously stated the tubular rods are provided for the purpose of supporting egg trays 117. Each egg tray is made up of a rectangular wooden frame provided with wire fabric bottom 118 fastened on by the strips 119. Arranged adjacent the longitudinal center of the wire fabric bottom 118 of each tray is a longitudinal channel guide 120, the side flanges of which are tapered almost to nothing at the forward end of the tray, while the opposite ends of the side flanges of the channel guide are flared as shown at 121. By flaring the side flanges in this manner they are permitted to straddle the tubular rods 106 when sliding the trays in position. The larger ends of the side flanges of the channel guides prevent lateral movement of the rear ends of the trays, while the shoulders 112 and 113 prevent lateral movement of the front ends of the trays. When sliding the trays in position washers 122 at the rear of the tubular rods are engaged by the rear ends of the trays for limiting them in position. The front ends of the trays have conventional form of handles 123 to permit the trays to be conveniently manipulated.

When the trays are in position, it is obvious that by manual manipulation of the links 116 the various strips 110 may be tilted on different angles as shown in Figure 6 and with them the egg trays, the shoulders 112 and 113 at the front act to prevent movement of the trays, while the larger ends of the side flanges of the channel guides prevent lateral displacement of the rear ends of the trays.

As shown in Figures 5, 6, 16, and 17 the trays are provided with covers 124, which consist of end pieces 125 and the longitudinal metal strips 126, which are covered by wire fabric 127 as shown, so that by means of the wire fabric, the moisture laden air may easily percolate therethrough, and in contact with the eggs in the tray. The end strips 125 of the covers have flanges 128, which engage in between the sides of the tray, to prevent movement of the covers, which are provided for keeping the chickens, when hatched in the trays, until removed.

Figures 5, 16, 17:
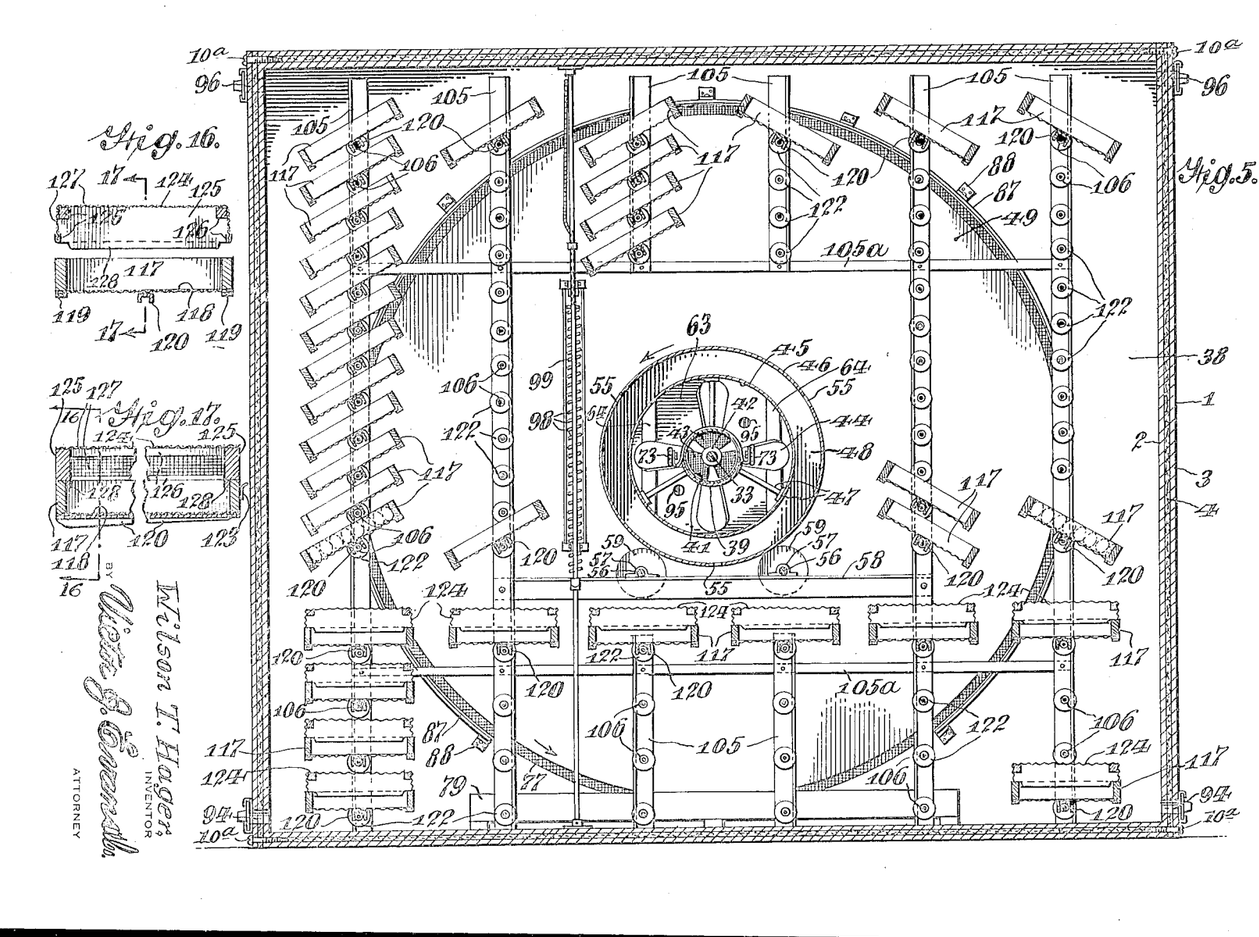
Figure 5 is a sectional view on line 5—5 of Figure 3.
Figure 16 is a transverse sectional view on line 16—16 of Figure 17 through an egg tray showing a cover.
Figure 17 is a longitudinal sectional view on line 17—17 of Figure 16.

As shown in Figure 5 at the right hand end thereof the eggs are placed in the trays on their ends, and arranged in rows, and by tilting the various trays, it is possible that the moisture ladened air may uniformly circulate around substantially all parts of the eggs.

Figure 20:
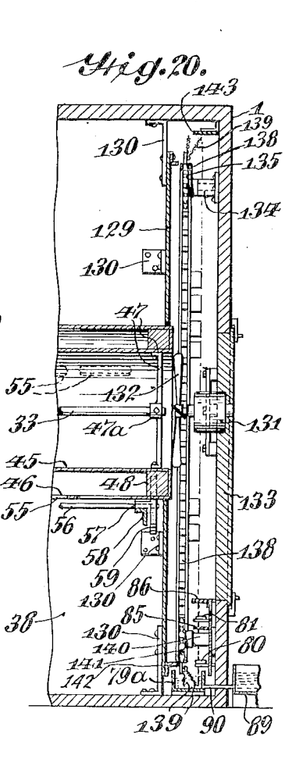
Figure 20 is a sectional view on line 20—20 of Figure 19 illustrating a fragmentary sectional part of the cabinet and illustrating the moisture carriers.

Referring to Figures 19 and 20 a modified construction of a moisture gathering device is disclosed, in lieu of the fabric pieces 77 and 78, as well as in lieu of the circular rotating plate 49. In other words a stationary plate 129 is supported in position by brackets 130, the stationary plate being in conformity to the rectangular shape of the cabinet, but slightly smaller in area, so as to provide passage between the plate and the ends, bottom and top of the cabinet. A motor 131 operates a fan 132 and is carried by the removable panel 133, as in Figure 2, and supported on stub shafts 134 are sprockets 135. The stub shafts 134 with their sprockets 135 are adjacent three corners of the cabinet, while a sprocket 136 is supported on a driven shaft 137 adjacent the remaining corner of the cabinet, to which shaft 137 power from any suitable source, preferably a motor (not shown) may be transmitted. A sprocket chain 138 engages with the sprockets 135 and 136, and certain of the links of the chain carry moisture gatherers 139. These individual moisture gatherers dip into the trough 79a, which contains water, and in this manner moisture on the gatherers 139 is carried toward the corners of the cabinet, hence insuring uniform moisture ladened air on the interior of the cabinet.

In order to insure dipping the individual moisture gatherers into the trough 79a a stub shaft 140 carrying a sprocket 141 is provided. The stub shaft 140 and its sprocket are arranged in a position lower than the operating shaft 137 and the lower stub shaft 134. Guiding supports 142 shown in dotted lines in Figure 19 are provided for the support of certain of the links of the chain intermediate those carrying the moisture gatherers, thereby preventing the sprocket chain from sagging during its travel over the sprockets.

Figures 19, 21:
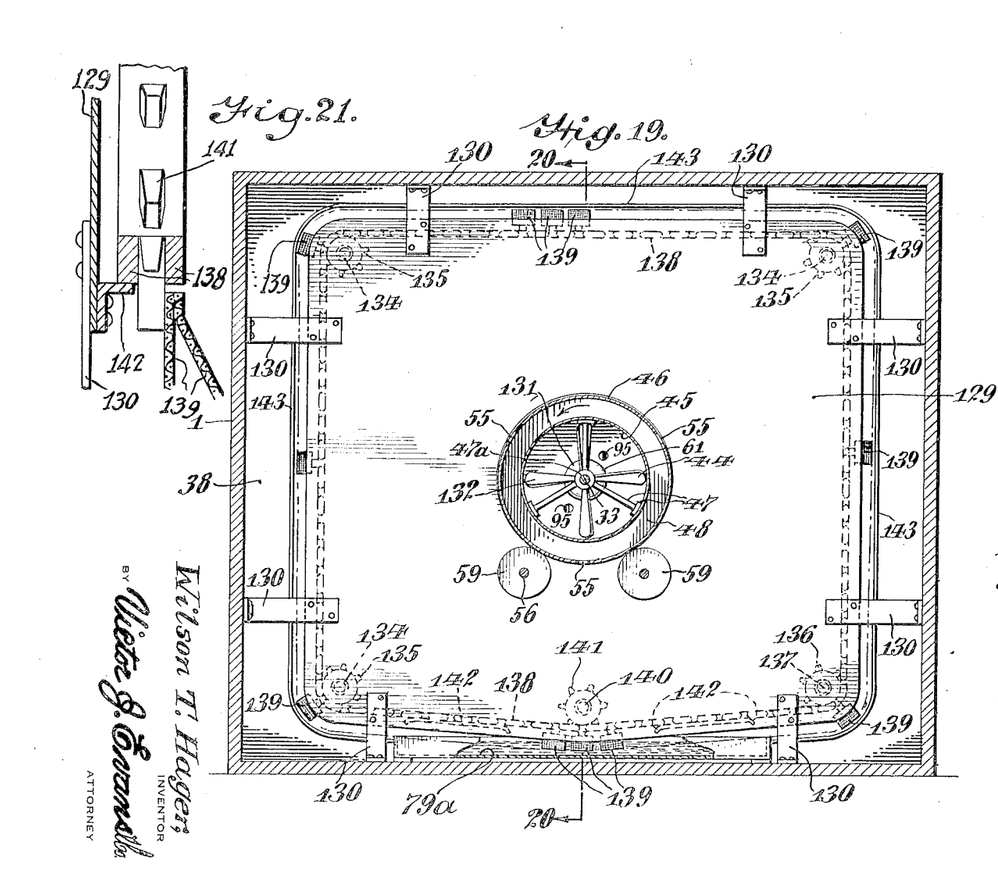
Figure 21 is an enlarged detail sectional view showing how the sprocket chain 138 travels on and is supported on the guiding supports 142.

As shown more clearly in Figure 21 certain links of the sprocket chain 138 travel and are supported on the guiding supports 142. These guiding supports 142 do not engage with the full thickness of the sprocket chain, therefore they will not interfere with the moisture gatherers 139.

As shown in Figures 19 and 20 the band 143 is used for the same purpose as the band 87. The greater part of the interior of the cabinet constitutes an incubation portion while the smaller portion of the interior of said chamber near the bottom thereof constitutes a hatching portion.

The invention having been set forth, what is claimed is:

1. In an incubator, a cabinet having a hatching space with means therein for supporting egg trays in tiers, said cabinet having intake air vents at the bottom and outlet air vents adacent the top, means for agitating the air and directing it from the back to the front of the cabinet, and means for causing an undulating course of the air centrally of said space from the back to the front and directing it centrifugally to all portions of the hatching space and maintaining a uniform distribution thereof.

2. In an incubator, a cabinet having a hatching space with means therein for supporting egg trays in tiers, said cabinet having intake air vents at the bottom and outlet air vents adjacent the top, means for agitating the air and directing it from the back to the front of the cabinet, means for causing an undulating course of the air centrally of said space from the back to the front and directing it centrifugally to all portions of the hatching space and maintaining a uniform distribution thereof, and means for furnishing moisture at the center of the cabinet at the time of the undulating course of the air from the back to the front.

3. In an incubator, a cabinet having a hatching space provided with means for the support of trays of eggs and having air intake vents adjacent the bottom and air outlet vents adjacent the top, means for agitating the air and sending it from one face of the cabinet toward an opposite face, means centrally of the cabinet for directing the air in an undulating course, means for subsequently circulating the air centrifugally from the center of the cabinet to all portions of the space, and means centrally of the cabinet for causing an impregnation of the air with moisture.

4. In an incubator, a cabinet having a hatching space provided with means for the support of trays of eggs and having air intake vents adjacent the bottom and air outlet vents adjacent the top, means for agitating the air and sending it from one face of the cabinet toward an opposite face, means centrally of the cabinet for directing the air in an undulating course, means for subsequently circulating the air centrifugally from the center of the cabinet to all portions of the space, means centrally of the cabinet for supplying moisture to the air that enters the directing means, and thermostatically operated means for automatically controlling the temperature in the space.

5. In an incubator, the combination with a cabinet provided with a hatching space, of means for supporting trays of eggs therein, said cabinet having air intake vents adjacent the bottom and air outlet vents adjacent the top, means for agitating the air and directing it from one face toward the opposite face of the cabinet, and revoluble drums one within spaced relation within the other and centrally of the cabinet for directing the air in an undulating course, one of the drums having openings for directing the air centrifugally to all portions of the space, thereby insuring uniformity of distribution.

6. In an incubator, the combination with a cabinet provided with a hatching space, of means for supporting trays of eggs therein, said cabinet having air intake vents adjacent the bottom and air outlet vents adjacent the top, means for agitating the air and directing it from one face toward the opposite face of the cabinet, revoluble drums one within spaced relation within the other and centrally of the cabinet for directing the air in an undulating course, one of the drums having openings for directing the air centrifugally to all portions of the space, thereby insuring uniformity of distribution, and means centrally of the space and in the path of the undulating course for supplying the air with moisture.

7. In an incubator, a cabinet having a hatching space with means therein for supporting egg trays in tiers, said cabinet having intake air vents at the bottom and outlet air vents adjacent the top, means for agitating the air and directing it from the back to the front of the cabinet, means for causing an undulating course of the air from the back to the front and directing it centrifugally to all portions of the hatching space and maintaining a uniform distribution thereof, and moisture carrying means substantially conforming to the maximum area of the space for carrying moisture to the air adjacent the various locations farthest from the center of the space.

8. In an incubator, a cabinet having a hatching space with means therein for supporting egg trays in tiers, said cabinet having intake air vents at the bottom and outlet air vents adjacent the top, means for agitating the air and directing it from the back to the front of the cabinet, means for causing an undulating course of the air from the back to the front and directing it centrifugally to all portions of the hatching space and maintaining a uniform distribution thereof, means for furnishing moisture at the center of the cabinet at the time of the undulating course of the air from the back to the front, and moisture carrying means substantially conforming to the maximum area in the space for supplying moisture to the air adjacent the various locations farthest from the center of the space.

9. In an incubator, a cabinet having a hatching space provided with means for the support of trays of eggs and having air intake vents adjacent the bottom and air outlet vents adjacent the top, means for agitating the air and sending it from one face of the cabinet toward the opposite face, means centrally of the cabinet for directing the air in an undulating course, means for subsequently circulating the air centrifugally from the center of the cabinet to all portions of the space, means centrally of the cabinet for causing an impregnation of the air with moisture, and moisture carrying means substantially conforming to the maximum area of the space for impregnating the air adjacent the various locations farthest from the center of the space.

10. In an incubator, a cabinet having a hatching space provided with means for the support of trays of eggs and having air intake vents adjacent the bottom and air outlet vents adjacent the top, means for agitating the air and sending it from one face of the cabinet toward an opposite face, means centrally of the cabinet for directing the air in an undulating course, means for subsequently circulating the air centrifugally from the center of the cabinet to all portions of the space, means centrally of the cabinet for causing an impregnation of the air with moisture, thermostatically operated means for automatically controlling the temperature in the space, and moisture carrying means substantially conforming to the maximum area of the space for impregnating the air adjacent the various locations farthest from the center of the space.

11. In an incubator, the combination with a cabinet provided with a hatching space, of means for supporting trays of eggs therein, said cabinet having air intake vents adjacent the bottom and air outlet vents adjacent the top, means for agitating the air and directing it from one face toward the opposite face of the cabinet, revoluble drums one within spaced relation within the other and centrally of the cabinet for directing the air in an undulating course, one of the drums having openings for directing the air centrifugally to all portions of the space, thereby insuring uniformity of distribution, and moisture carrying means substantially conforming to the maximum area of the space for impregnating the air adjacent the various locations farthest from the center of the space.

12. In an incubator, the combination with a cabinet provided with a hatching space, of means for supporting trays of eggs therein, said cabinet having air intake vents adjacent the bottom and air outlet vents adjacent the top, means for agitating the air and directing it from one face toward the opposite face of the cabinet, revoluble drums one within spaced relation within the other and centrally of the cabinet for directing the air in an undulating course, one of the drums having openings for directing the air centrifugally to all portions of the space, thereby insuring uniformity of distribution, means centrally of the space and in the path of the undulating course for impregnating the air with moisture, and moisture carrying means substantially conforming to the maximum area of the space for impregnating the air adjacent the various locations farthest from the center of the space.

13. In an incubator, a cabinet having a hatching space, said space having air intake vents adjacent the bottom and air outlet vents adjacent the top, agitating means disposed centrally of and distributing air centrally and transversely of the space, means for supplying moisture to the air, said space including means for the support of trays of eggs in surrounding relation to the central air distributing means, whereby the eggs may be subjected to uniform moisture impregnated air, said moisture supplying means being in the path of the air and where the air is originally distributed, said moisture supplying means including a revoluble element having moisture gathering fabric elements for moving adjacent various locations farthest from the center of the space for additionally supplying moisture to the air, thereby providing a constant uniformly moisture laden atmosphere in said space.

14. In an apparatus for hatching eggs having a hatching chamber, means for positively causing air to be moved into and substantially at and through substantially the center of said chamber, means for directing said air in an undulated course, said means being adapted to centrifugally distribute said air to all portions of said chamber, means for impregnating the air with moisture prior to said distribution, and means for subsequently mixing the air with additional moisture throughout substantially the entire area of the chamber, thereby creating substantially uniform temperature.

WILSON T. HAGER.